June 29, 1926.
W. FUHRMANN
1,590,678
CONDENSER FOR ELECTRIC CIRCUITS
Filed April 7, 1925
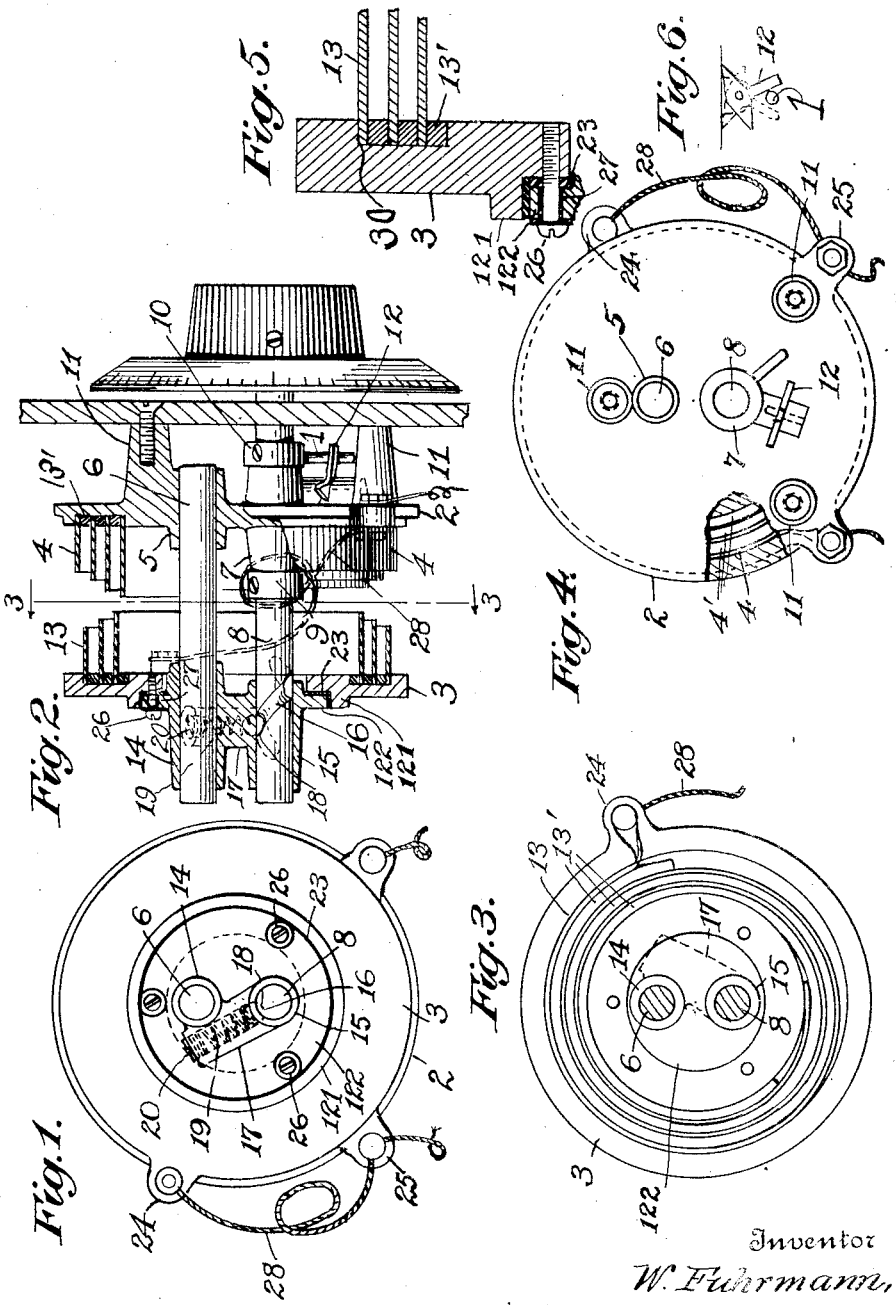
Inventor
W. Fuhrmann,
By his Attorney
Wm H. Reid Patented June 29, 1926.

1,590,678

UNITED STATES PATENT OFFICE.

WARREN FUHRMANN, OF WESTFIELD, NEW JERSEY, ASSIGNOR TO THE FURNELL MANUFACTURING CORP., OF NEWARK, NEW JERSEY, A CORPORATION OF NEW JERSEY.

CONDENSER FOR ELECTRIC CIRCUITS.

Application filed April 7, 1925. Serial No. 21,299.

The invention has for its object to provide an improved arrangement for causing approach and recession of a pair of capacitance elements each composed of an evolute coil, wherein the advancing means, and also the guiding means, between the elements, are located inside of the coils and are in proximity to the axis of the coils.

A further object of this invention is to provide means for winding up each of the coils to cause spacing of the convolutions the desired amount, so that such a wound coil can be readily assembled on its carrier or supporting member.

In the accompanying drawing showing embodiments of my invention:—

Figure 1 is a rear end view.

Fig. 2 is a vertical section, partly in elevation.

Fig. 3 is a section on the line 3—3 of Fig. 2.

Fig. 4 is a front elevation partly in section.

Fig. 5 shows a partial enlarged section through one of the coil mountings.

Fig. 6 shows the stop device.

The structure comprises essentially a pair of carriers each having an evolute coil on one face, a shaft fixed to one carrier and sliding in a sleeve of the other carrier; in combination with second shaft engaging a sleeve in each of the carriers, and rotatable in one sleeve without advancing, and having a screw threaded connection with the other carrier, so that when the shaft is rotated it will advance to interleave the coils.

In the structure shown I provide carriers 2 and 3 preferably of metal. An evolute coil 4 is mounted on the carrier 2 by suitable means in one face of the plate 2. This carrier is provided with a sleeve 5 extending transverse to the plate, in which is secured a shaft 6, and this plate 2 is also provided with a sleeve or bearing 7 in which turns a drive shaft 8, that is prevented from advancing in the sleeve by suitable means, such as collars 9 and 10 on the shaft. The shafts 6 and 8 are parallel and perpendicular to the carrier plate 2. This plate also preferably carries mounting bosses 11 for attachment to the panel of a radio apparatus in the usual manner.

The other member of the device is provided with a carrier plate 3 having an evolute coil 13 mounted on one face, similar to the evolute coil 4. This carrier plate is provided with a bearing hub 14 arranged to receive the shaft 6 that is slidable therein, and which supports the bearing plate 3 parallel with the bearing plate 2, and permits these plates to approach and recede. It will be further observed that the meeting edges of these two coils are not arranged in parallel planes but as shown are somewhat in the outline of a cone. This will result in the edges being brought to register progressively throughout the edges instead of registering simultaneously. The rotating in such a condenser of its dial will thereby be more nearly uniform accordingly to the design of this conical edge when the coils are first brought together. However this arrangement of conical evolute coils forms a subject matter of another application of mine Ser. No. 758,798 filed Dec. 30, 1924, and is not claimed herein.

The carrier plate 3 is further provided with a bearing sleeve 15 that receives the other end of the control shaft 8, that will form additional guiding means for the parallel movements of the two carrier plates. Means are provided on this carrier plate 3 and the shaft 8 whereby turning the shaft will advance it in the bearing 15 and since this shaft is prevented from endwise movements on the carrier plate 2 such turning of this shaft will cause the carrier plates to approach and recede. As shown I provide the shaft with a helical groove or channel 16. A boss 17 integral with the plate 3 has its bore arranged to carry a ball 18, that is pressed against the shaft 8 by a coil spring 19 in this boss, which is retained and tensioned by a stud 20 that screws in the threaded outer end of the boss. This ball is thereby yieldably held in the groove 16 in the shaft 8, and the ball and grooved shaft will act as a screw and nut whereby rotation of the shaft will advance the plate 3 to and from the carrier plate 2.

Since the two coils must form opposite terminals by a circuit they must be insulated and to this end the carrier plate 3 is formed in two sections by separating it inside of the coil 13, so that it comprises a ring portion 121, and a disk portion 122 that engages the two shafts. This ring portion is supported by a gasket 23 of suitable insulating material such as fiber or hard rubber. The two portions 121 and 122 are here held together by screws 26 that have insulating bushings 27.

The carrier 2 is shown provided with a terminal 25 for the circuit, and carrier 3 with terminal 24, connected by cable 28.

It will be understood that the device can be readily mounted by the several bosses 11 on the inner wall of a panel, or other convenient place, with the shaft 8 projecting through at the front of the panel. This support of the carrier plate 2 will also support carrier plate 3 through the two shafts, its members also serve to guide the carrier plate 3. When the shaft 8 is rotated by a dial or other means, the screw threaded connection with the carrier plate 3 will cause advance of the coil 13 to and from the opposite coil 4 as desired. It will be further seen that the screw thread can be so arranged that the shaft 8 will make one complete revolution to cause advance and recession of the two evolute coils for the range of the instrument. By placing the shaft connection inside of the coils a very compact structure is produced.

The means shown for mounting the evolute coils in their carrier plates comprising a strip 13' that may be metal, of a width or thickness equal to the distance apart of the convolutions of the coil as indicated in Figs. 3 and 5. A single strip is provided the length of the coil and the two are wound up together in the form of a spacing strip 13' engaging the opposite walls of the coils as indicated in Fig. 5. This portion of the combined strip is then inserted in a suitable channel 30 in the supporting member 3 or 2, and can be secured therein by solder or other means or may be a driving fit. The two strips that wound up can also be secured by solder or other means before insertion in the annular channel 30.

12 is a shifting limit stop on the frame 2, that engages pin 1 on the shaft 8 to permit full rotation of the shaft.

What I claim is:—

1. An electric condenser comprising two carriers, a capacitance element mounted on each said carrier each composed of a single flat strip curved in the general form of an evolute coil, a shaft mounted on one carrier inside of the coil, a sleeve on the other carrier inside of the coil by which it is slidable on said shaft to cause said elements to interleave, a second shaft rotatably mounted in said first carrier without endwise movement therein, a bearing in the second carrier inside of the coil in which the second shaft is movable, and means arranged to effect reciprocation of said carriers by oscillation of the shaft.

2. An electric condenser comprising two carriers, a capacitance element mounted on each said carrier each composed of a single flat strip curved in the general form of an evolute coil, a shaft mounted on one carrier inside of the coil, a sleeve on the other carrier inside of the coil, by which it is slidable on said shaft to cause said elements to interleave, a second shaft rotatably mounted in said first carrier inside of the coil without endwise movement therein, a bearing in the second carrier inside of the coil in which the second shaft is movable, and means arranged to effect reciprocation of said carriers by oscillation of the shaft, one of said carriers being in two portions separated by an insulating bushing whereby the capacitance element thereon is insulated from said bearings on such carrier.

3. An electric condenser comprising two carriers, a capacitance element mounted on each said carrier each composed of the single flat strip curved in the general form of an evolute coil, a shaft mounted on one carrier inside of the coil, a sleeve on the other carrier inside of the coil by which it is slidable on said shaft to cause said elements to interleave, a second shaft rotatably mounted in said first carrier inside of the coil without endwise movements therein, a bearing in the second carrier inside of the coil in which the second shaft is movable, said bearing connection comprising a spiral groove in the shaft, a ball mounted in a socket in the frame, a screw turning in a threaded bore of said socket, and a spring between the screw and the ball to press the ball into said spiral groove.

4. An electric condenser comprising two carriers, a capacitance element mounted on each said carrier each composed of a strip curved in the general form of an evolute coil, a shaft rotatably mounted in said one carrier inside of the coil without endwise movement therein, a bearing in the other carrier inside of the coil in which the said shaft is movable to cause said elements to interleave, means between the said shaft and its bearing on the second member to effect reciprocation of said carriers by oscillation of the shaft, and guiding means between the two carriers inside of the coils.

5. An electric condenser comprising two carriers, a capacitance element mounted on each said carrier each composed of a single flat strip curved in the general form of an evolute coil, a shaft mounted on one carrier inside of the coil, a sleeve on the other carrier inside of the coil by which it is slidable on said shaft to cause said elements to interleave, a second shaft rotatably mounted in said first carrier without endwise movement therein, a bearing in the second carrier inside of the coil in which the second shaft is movable, and means arranged to effect reciprocation of said carriers by oscillation of the shaft, said two shafts being arranged adjacent the axis of said coils on opposite sides thereof.

6. In an electric condenser, a base, and an evolute coil, composed of a flat strip wound in the general form of an evolute with the convolutions spaced apart to permit a pair of such coils to interleave, and a comparatively narrow spacing strip of evolute form wound up in said evolute coil at one edge thereof to space the convolutions apart by the opposite side faces of the strip in engagement with the opposite sides of the evolute coil, and means for securing the said coil and strip together and for securing the same to the base.

7. In an electric condenser, a base, and an evolute coil, composed of a flat strip wound in the general form of an evolute with the convolutions spaced apart to permit a pair of such coils to interleave, and a comparatively narrow spacing strip of evolute form wound up in said evolute coil at one edge thereof to space the convolutions apart by the opposite side faces of the strip in engagement with the sides of the evolute coil, said base member having an annular channel engaging the inner and outer walls of the coil at the face containing said spacing strip and secured thereto.

Signed at New York city, N. Y., on 4th day of April, 1925.

WARREN FUHRMANN.